J. North,
Hook.
Nº 30,687. Patented Nov. 20, 1860.
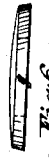
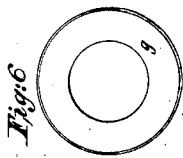
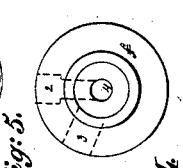
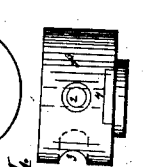
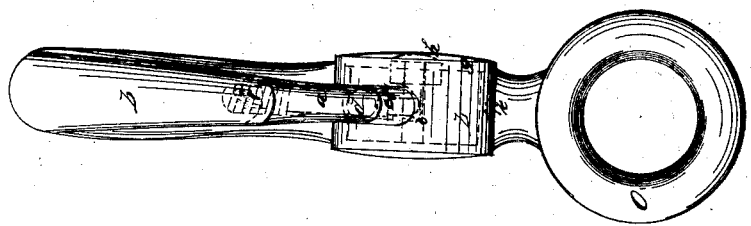
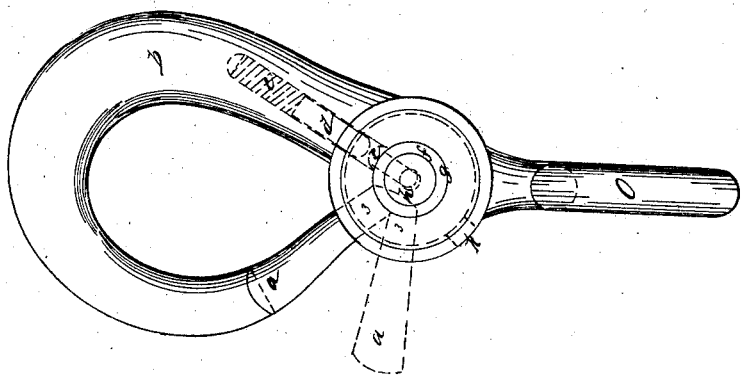

UNITED STATES PATENT OFFICE.

JOHN NORTH, OF MIDDLETOWN, CONNECTICUT.

MOUSING-HOOK.

Specification of Letters Patent No. 30,687, dated November 20, 1860.

*To all whom it may concern:*

Be it known that I, JOHN NORTH, of Middletown, in the county of Middlesex, in the State of Connecticut, have invented a new and Improved Mousing-Hook; and I do hereby declare that the following is a full and exact description thereof, reference being had to the accompanying drawings, and to the letters of reference marked thereon, making a part of this specification, in which—

Figure 1, is the front view of the mousing-hook complete, showing the spring, driver, and piston in dotted lines, and the upper end of the thumb-catch; the tongue is shown in dotted lines as it appears when unlocked and opened. Fig. 2 is a side view of the hook; the dotted lines showing the construction and application of the parts to the hook. Fig. 3 represents the spiral spring, driver, piston and the thumb-catch, all in their relative positions, one to the other, as when combined to the tumbler and hook. Fig. 4 represents the outer side of the tumbler, with the holes to receive the piston, and tongue. Fig. 5 is a front view of the tumbler with the dotted lines, showing the holes for the piston and tongue, and the center hole to receive the thumb-catch. Figs. 7 and 8 represent the cap which secures the tumbler to the hook.

The want of a safe and secure mousing-hook for a ship's tackle has long been wanted by seamen, as much trouble and danger is experienced many times on account of the insecurity of the present hook now in use, and of having to mouse them by tying them up, and in times of great gales much difficulty is experienced in doing it.

I am aware that patents for mousing hooks have been granted, but they do not answer the purpose required of them, and to accomplish the desired result is the object of my invention, the nature of which consists in so constructing and arranging it so as to be applied to the rigging of the vessel quickly, and to be adjusted securely to the rigging of a vessel by hooking to it, and of pressing the tongue against the end of the hook which locks it fast. It is readily unlocked by pressing the thumb-catch down with the thumb, and by pulling on the tongue.

To enable others, skilled in the art to make and use my invention, I will proceed to describe its construction and operation.

I make a strong hook having a round swell or hub between the hook $b$, and the eye $o$. This swell or hub has a large hole drilled into it, as shown by dotted lines of Figs. 1 and 2, into which the tumbler $f$ is placed, and to which the tongue is secured at 3. The large part of the hook which joins to the hub has a hole drilled into it which is about one-fourth of an inch in diameter and one and a half inches deep, which is done by drilling through the hub at $k$; into this hole the spiral spring $e$, and the driver $d$, (see Fig. 3,) are put. The thumb-catch $h$ is put into the center hole in the tumbler $f$, at 4, see Figs. 2 and 5, and the piston $c$ into the hole 2, in the tumbler $f$. The tumbler is then placed into the recess made in the hub to receive it, the tongue $a$ is put through the opening in the hub at $m$, and is secured to the tumbler at 3. The lower and small end of the thumb-catch has a recess made into it at $i$, to receive the small end of the piston $c$ and prevents the thumb-catch $h$ from coming out and getting lost; the recess is slanted upward, and allows the thumb catch $h$ to be pressed down, and in so doing, the piston which being in contact with the thumb-catch will force the drivers out of the tumbler, $f$, (see Fig. 3 and line "$y$,") and allows the tongue to be opened. The tongue $a$ when closed against the hook brings the hole 2 in the tumbler $f$, on a line with the hole $d$, in the hook $b$. The spring $e$ will then force the driver $d$, into the hole 2 of the tumbler $f$, and force the piston $c$ against the thumb-catch $h$ and push it up. The cap $g$ is placed in the recess of the hub over the tumbler $f$, its outer edge being beveled, and is secured to the hub by hammering the outer edge of the hub close to the edge of the cap, and is held fast.

The tumbler $f$, piston $c$, driver $d$, and spring $e$, may be made of hard brass to prevent the rusting of them.

Having thus fully described my invention, what I claim as new and desire to secure by Letters Patent is—

An improved mousing-hook, when arranged substantially as, and for the purpose, described, forming a new and improved article of manufacture.

JOHN NORTH.

In presence of—
 JONATHAN BARNES,
 CATHARINE S. ROGERS.